(12) United States Patent
Bokade et al.

(10) Patent No.: US 11,630,924 B2
(45) Date of Patent: Apr. 18, 2023

(54) SHARING DATA WITH A PARTICULAR AUDIENCE

(71) Applicant: Micron Technology, Inc., Boise, ID (US)

(72) Inventors: Bhagyashree Bokade, Boise, ID (US); Anusha Gunda, Boise, ID (US); Lisa R. Copenspire-Ross, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 160 days.

(21) Appl. No.: 17/006,662

(22) Filed: Aug. 28, 2020

(65) Prior Publication Data

US 2022/0067216 A1 Mar. 3, 2022

(51) Int. Cl.
  *G06F 21/78* (2013.01)
  *G06F 21/36* (2013.01)
  *G06F 21/62* (2013.01)
  *G06F 9/54* (2006.01)
  *G06F 9/50* (2006.01)
  *G06F 21/16* (2013.01)

(52) U.S. Cl.
  CPC .......... *G06F 21/78* (2013.01); *G06F 9/5016* (2013.01); *G06F 9/542* (2013.01); *G06F 21/16* (2013.01); *G06F 21/36* (2013.01); *G06F 21/62* (2013.01); *G06F 21/6218* (2013.01); *G06F 2221/2113* (2013.01)

(58) Field of Classification Search
  CPC .......... G06F 21/78; G06F 21/16; G06F 21/36; G06F 21/62; G06F 21/6218; G06F 9/5016; G06F 9/542; G06F 2221/2113
  See application file for complete search history.

(56) References Cited

U.S. PATENT DOCUMENTS

| | | | |
|---|---|---|---|
| 10,432,401 B2 | 10/2019 | O'Hare et al. | |
| 10,523,644 B2 | 12/2019 | Werneyer | |
| 10,652,231 B2 | 5/2020 | Patton et al. | |
| 2003/0189603 A1* | 10/2003 | Goyal | G06F 40/232 704/E15.04 |
| 2005/0138110 A1* | 6/2005 | Redlich | G06F 21/6254 709/201 |
| 2010/0024037 A1* | 1/2010 | Grzymala-Busse | G06F 21/6245 707/E17.046 |

(Continued)

*Primary Examiner* — Han Yang
(74) *Attorney, Agent, or Firm* — Brooks, Cameron & Huebsch, PLLC

(57) ABSTRACT

Methods, apparatuses, and non-transitory machine-readable media associated with sharing data with a particular audience are described. Examples can include receiving first data at a processing resource, determining whether the first data comprises a combination of bits associated with text or an image, or both, and comparing the combination of bits to second data stored on a memory resource. Examples can include identifying one or more words or one or more images represented by the first data, or both, based on the comparison and assigning to the first data first metadata representative of a first security categorization and a first confidence level and second metadata representative of a second security categorization and a second confidence level Examples can include transmitting an output that comprises the first data or third data that comprises a modified combination of bits relative to the combination of bits of the first data.

12 Claims, 6 Drawing Sheets

(56) References Cited

U.S. PATENT DOCUMENTS

| | | | |
|---|---|---|---|
| 2017/0124082 A1* | 5/2017 | Bostick | G06Q 50/01 |
| 2019/0394020 A1 | 12/2019 | Lepoint | |
| 2020/0082111 A1* | 3/2020 | Leemet | G06F 16/116 |
| 2020/0084051 A1 | 3/2020 | Bessonov et al. | |
| 2020/0143016 A1* | 5/2020 | Borkar | G06F 21/10 |
| 2020/0259819 A1 | 8/2020 | Patton et al. | |
| 2022/0043935 A1* | 2/2022 | Brannon | G06F 16/332 |

* cited by examiner

590 ↘

```
┌─────────────────────────────────────────────────────────────┐
│   RECEIVING A REQUEST AT A PROCESSING RESOURCE              │── 591
│   TO SHARE A PARTICULAR INPUT WITH A PARTICULAR AUDIENCE    │
└─────────────────────────────────────────────────────────────┘
                              │
┌─────────────────────────────────────────────────────────────┐
│   COMPARING THE PARTICULAR INPUT TO A DATABASE              │
│   COMMUNICATIVELY COUPLED TO THE PROCESSING RESOURCE TO     │── 592
│   DETERMINE WHETHER THE PARTICULAR INPUT HAS BEEN           │
│   PREVIOUSLY SHARED WITH THE PARTICULAR AUDIENCE            │
└─────────────────────────────────────────────────────────────┘
                              │
┌─────────────────────────────────────────────────────────────┐
│   BASED ON THE COMPARISON, DETERMINING A SHARING STATUS OF  │
│   THE PARTICULAR INPUT, THE SHARING STATUS INCLUDING        │
│   A DETERMINATION WHETHER THE PARTICULAR INPUT CAN BE SHARED│── 593
│   WITH THE PARTICULAR AUDIENCE, CANNOT BE SHARED            │
│   WITH THE PARTICULAR AUDIENCE, OR IT IS UNDETERMINED       │
│   IF THE PARTICULAR INPUT CAN BE SHARED WITH                │
│   THE PARTICULAR AUDIENCE                                   │
└─────────────────────────────────────────────────────────────┘
                              │
┌─────────────────────────────────────────────────────────────┐
│   NOTIFYING A SENDER OF THE REQUEST THAT THE PARTICULAR INPUT│
│   CAN BE SHARED WITH THE PARTICULAR AUDIENCE RESPONSIVE     │── 594
│   TO THE SHARING STATUS INDICATING THAT                     │
│   THE PARTICULAR INPUT CAN BE SHARED                        │
└─────────────────────────────────────────────────────────────┘
                              │
┌─────────────────────────────────────────────────────────────┐
│   NOTIFYING THE SENDER OF THE REQUEST THAT THE PARTICULAR INPUT│
│   CANNOT BE SHARED WITH THE PARTICULAR AUDIENCE RESPONSIVE TO│── 595
│   THE SHARING STATUS INDICATING THAT THE PARTICULAR INPUT   │
│   CANNOT BE SHARED                                          │
└─────────────────────────────────────────────────────────────┘
                              │
┌─────────────────────────────────────────────────────────────┐
│   REQUESTING AN APPROVAL FROM AN ADMINISTRATOR TO SHARE     │
│   THE PARTICULAR INPUT WITH THE PARTICULAR AUDIENCE RESPONSIVE│── 596
│   TO AN UNDETERMINED SHARING STATUS AND NOTIFYING           │
│   THE SENDER OF RESULTS OF THE REQUESTED APPROVAL           │
└─────────────────────────────────────────────────────────────┘
```

*FIG. 5*

SHARING DATA WITH A PARTICULAR AUDIENCE

TECHNICAL FIELD

The present disclosure relates generally to apparatuses, non-transitory machine-readable media, and methods associated with sharing data with a particular audience.

BACKGROUND

Data security includes protecting data, such as data in a database, from destructive forces and from the unwanted actions of unauthorized users, such as a cyberattack or a data breach. Data security can include protecting data from unauthorized access and data corruption throughout its lifecycle. Data security includes data encryption, hashing, tokenization, and/or key management practices that protect data across different applications and platforms.

It may be desirable to share secured or unsecured data in some instances. Data sharing can include sharing data between two or more parties (e.g., individuals, organizations, or a combination thereof). Data can be shared from one party to another or between the parties. When the data is secured data, authorization may be required prior to sharing.

BRIEF DESCRIPTION OF THE DRAWINGS

FIG. 5 is yet another flow diagram representing an example method for sharing data with a particular audience in accordance with a number of embodiments of the present disclosure.

DETAILED DESCRIPTION

Figure 1:
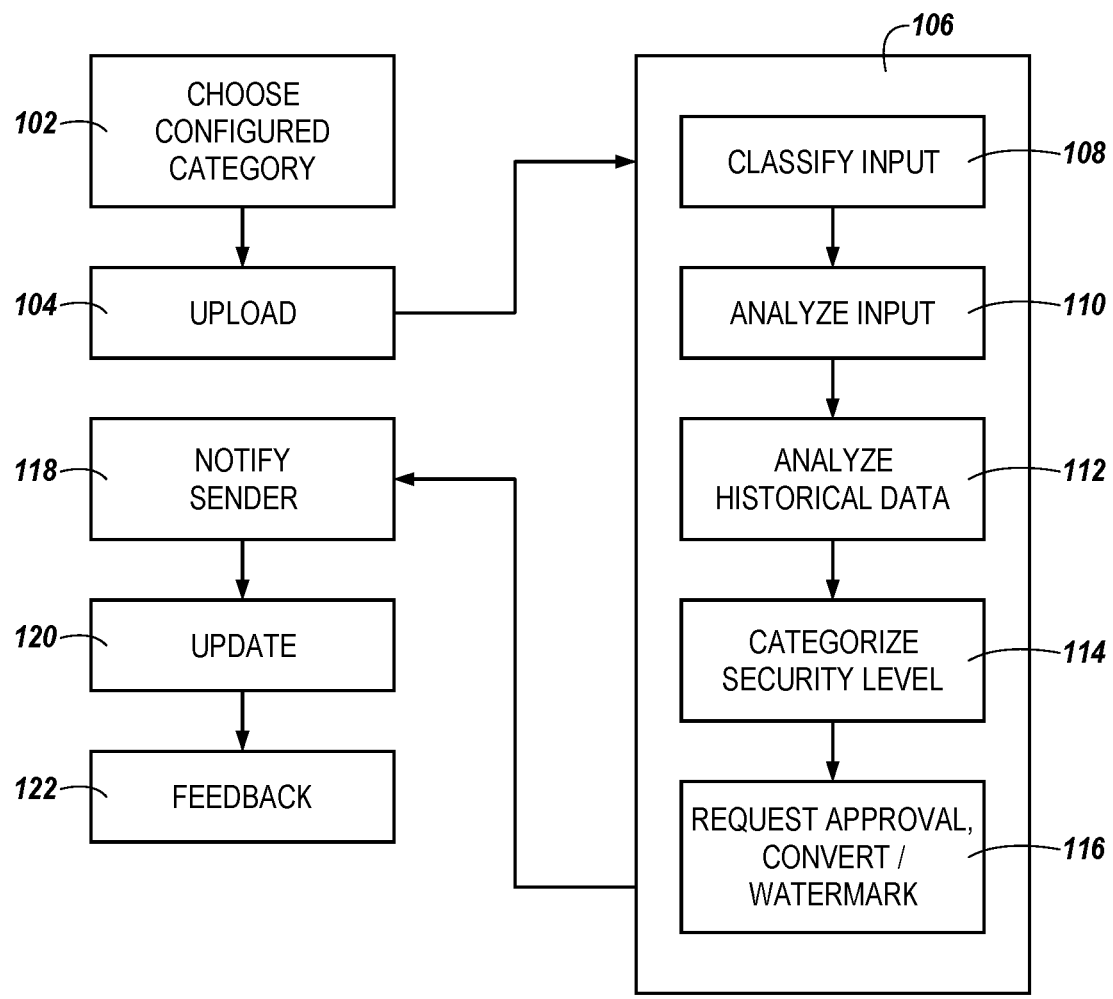
FIG. 1 is a flow diagram representing an example method for sharing data with a particular audience in accordance with a number of embodiments of the present disclosure.

Apparatuses, machine-readable media, and methods related to sharing data with a particular audience are described. An individual or organization may desire to share particular data with a different user or organization, but the sharing may need to be authorized by an administrator or administrators. This process can include gaining authorization from a supervisor each time data sharing is desired with respect to what portions (if any) of the data can be shared and with whom the data can be shared. This process can be time consuming and may result in inconsistent sharing depending on who approved/disapproved of sharing of particular data and when the approval/disapproval was received.

Examples of the present disclosure can improve efficiency in data sharing. Data sharing in accordance with the present disclosure can reduce time spent in authorization processes by utilizing a data sharing database against which data desired to be shared can be compared. Data sharing decisions can be based on the comparisons, which can improve efficiency and consistency in data sharing approvals/denials. Examples of the present disclosure can utilize artificial intelligence (AI) to improve data sharing decisions using historical and other data associated with current and prior requests for data sharing. AI, as used herein, includes a controller, computing device, or other system to perform a task that normally requires human intelligence. For example, a share tool as further described herein, can sort data and make data sharing decisions that normally require human intelligence. AI can include the use of one or more machine learning models.

Examples of the present disclosure can include a method for sharing data with a particular audience including receiving first data at a processing resource, determining at the processing resource whether the first data comprises a combination of bits associated with text or an image, or both, and comparing the combination of bits to second data stored on a memory resource or storage coupled to the processing resource via a network. Examples can include identifying one or more words represented by the first data or one or more images represented by the first data, or both, based at least in part on the comparison, and the method can further include assigning to the first data first metadata representative of a first security categorization and a first confidence level that is based at least in part on the identified word or words and second metadata representative of a second security categorization and a second confidence level that based at least in part on the identified image or images. Examples can include transmitting, to a set of users via the network and based at least in part on the first or second security categorizations and the first or second confidence levels, an output that comprises the first data or third data that comprises a modified combination of bits relative to the combination of bits of the first data.

Other examples of the present disclosure can include a non-transitory machine-readable medium comprising a processing resource in communication with a memory resource having instructions executable to receive a request to share first data received at the processing resource with a particular audience. The examples can include the instructions executable to determine, using AI, a first portion of the first data that can be shared with the particular audience, a second portion of the first data that cannot be shared with the particular audience, a third portion of the first data with an undetermined sharing status, or a combination thereof based on comparison of the request to second data stored on the memory resource. The instructions can be executable to request approval from an administrator to share the third portion with the particular audience, write the first data associated with the request, the first portion, the second portion, and the third portion to the memory resource, watermark and share with the particular audience the first portion and the third portion responsive to the third portion being approved for sharing, and watermark and share with the particular audience the first portion responsive to the third portion being approved for sharing.

Yet other examples of the present disclosure can include a same or different non-transitory machine-readable medium comprising a processing resource in communication with a memory resource having instructions executable to classify, using AI, received first data having a combination of bits associated with text or an image, or both, categorize, using the AI, the first data as one a plurality of predetermined security levels based on analyzed content of the classified first data, and assign, using the AI, a confidence level to the security level categorization. The instructions can be executable to compare the combination of bits to second data stored on the memory resource, and determine, based on the comparison, the security level categorization and the confidence level, a sharing status of the first data, the sharing status including a determination whether the first data can be shared with a particular audience, cannot be shared with the particular audience, or it is undetermined if the first data can be shared with the particular audience.

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures can be identified by the use of similar digits. For example, 106 can reference element "06" in FIG. 1, and a similar element can be referenced as 206 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Sharing data may include authorization. Examples of the present disclosure can include a user requesting to share data, (e.g., a particular input) with a particular audience. For instance, an individual or team at Organization A may desire to share a workflow with an individual or team at Organization B. Examples of the present disclosure allow for the individual or team at Organization A to upload the data, which may include sensitive and/or secure data, to a share tool to determine whether data may be shared with the particular audience (e.g., Organization B), may not be shared with the particular audience, or if approval is needed from an administrator. In some examples, the share tool can be a self-learning AI share tool such that the share tool learns and updates itself as data sharing requests are made. In some examples, the share tool includes machine learning models.

FIG. 1 is a flow diagram representing an example method for sharing data with a particular audience in accordance with a number of embodiments of the present disclosure. With respect to at least FIG. 1, the data desired to be shared is referred to as "particular input" so as to differentiate from other data referred to with respect to the description of FIG. 1. The data desired to be shared, or the "particular input" can include a document, data, image, video, or other data that may require authorization before sharing. For instance, the data desired to be shared, or the "particular input" can include documents a first company employee desires to share with an employee of a contracted second company. The documents may not be shared without authorization, for example.

At 102, a configured category is chosen. For instance, a configured category can include a class or division in which the particular input may fall. This can be based on a department within an organization, a project with which the particular input is a part, data associated with the particular input (e.g., memory type used, budget, yield rate, subject matter classification, etc.). A user can select an option provided from a predetermined list or may be able to create a new configured category. Additional data may be included in the particular input (e.g., images, definitions, support documents, why the request is being made, etc.), and at 104, the particular input can be uploaded to a share tool 106.

The share tool 106 can include, in some examples, a processing resource in communication with a memory resource that utilizes AI to sort particular input into sharable, non-sharable, and undefined categories. Put another way, the share tool 106 creates a share status for the particular input, portions of the particular input, or both (e.g., "sharable" share status, "not sharable" share status, "undetermined" share status, etc.). The share tool 106 (and associated AI (e.g., including machine learning model(s)) can be trained using a training dataset. For instance, the training dataset can include a set of examples used to fit parameters of the AI. For instance, the training dataset can include data associated with sharable image data, text data, both image and text data, and associated shareability. In some examples, the share tool 106 can also be trained using new input data (e.g., the particular input, among others).

Within the share tool 106, the method can include AI identifying file types such as documents (e.g., pdf, word processing programs, etc.), images, paragraphs from particular file formats, and/or circuit board files (e.g., circuitry, connections in memory types (e.g., NAND)), among others. At 108, the particular input can be classified as text or an image, or both. For instance, it may be determined at the processing resource whether the particular input comprises a combination of bits associated with text or an image, or both. Classification of the particular input can include, for instance, a text search, image recognition, "looks like" tools, file parsing, binary decoding, or a combination thereof, among others.

At 110, the method can include analyzing the particular input. For instance, intellectual property within the particular input can be identified (e.g., using text recognition, image recognition, etc.). Identifying intellectual property can allow for identification of data associated with the particular input that may be redacted from shared data or may prevent sharing altogether. Intellectual property can include creations of the mind, such as inventions, literary and artistic works, designs, and symbols, names, and images used in commerce. As used herein, intellectual property may be data an individual or organization does not want to share or may choose to share in limited circumstances (e.g., under a non-disclosure agreement).

At 112, historical data associated with the particular input is analyzed. Utilizing AI, a determination can be made whether data having the same components with a same purpose as the particular input has been shared with the particular audience previously. For instance, a memory resource or storage couples to the processing resource via a network (e.g., a database) may be maintained that includes historical data from previous requests to share data, and a comparison can be made between the particular input and the memory resource or storage. Matches during the comparison including matches where the particular input has been previously shared with the particular audience or matches where the particular input has affirmatively not been previously shared with the particular audience can affect a sharing determination. For instance, if historically the particular input has been shared with the particular audience, it may be likely that authorization is given (e.g., via the share tool 106) to share it again. Matches, in some instances, may include matches of portions of the particular input such as specific words, images, or image segments.

At 114, based on the input classification, the analysis of the particular input, and the analysis of the historical data, the particular input can be categorized into one of a plurality of predetermined security levels (e.g., "highly confidential", "confidential", "internal only", "public", etc.). For example, the particular input can be assigned metadata representative of a security categorization. This categorization can be done automatically such that the categorization is performed with limited or no user input and/or with limited or no prompting. For instance, if specific words in the particular input match words in the memory resource or storage that have previously been categorized as highly confidential, the same security categorization may be administered to the particular input or at least a portion of the particular input.

In some instances, a confidence level can be assigned to the security categorization. For example, the particular input can be assigned metadata representative of a confidence level. In some instances, if the share tool 106 has a higher faith in the security categorization (e.g., exact word matches, image segment matches, etc. for all words and images in the particular input), a confidence level may be higher (e.g., closer to 100 percent), whereas if the share tool 106 has a lower faith in the security categorization (e.g., some word matches, some image segment matches, etc. for words and images in the particular input), a confidence level may be lower (e.g., further from 100 percent). A confidence level can be based on, for instance, a training data set provided to the share tool 106. The training data set can include a set of examples used to fit parameters of the share tool 106 (e.g., for use by AI (e.g., and/or an associated machine learning algorithm) of the share tool). The share tool 106 can be trained on the training data set to make determinations regarding confidence levels. The share tool 106 can be updated based on the particular input and/or other inputs.

The method can include, at 116, requesting approval from an administrator or group of administrators if a sharing status was undetermined. For instance, if no match can be made with the particular input and the memory resource or storage, if only a partial match can be made (e.g., particular input has been shared with different audience), or if a confidence level associated with a security categorization is low, an administrator or administrators may be prompted to review the request. For instance, a panel of administrators may be determined to poll for approval or denial of the request. The panel may include supervisors, department heads, lead engineers, project managers, those familiar with the project, etc. Once the request is submitted, progress of the panel's review may be tracked, and panel members, panel members' decisions, and panel members' justifications for their decisions may be added to the memory resource or storage and the share tool 106 and associate AI may be updated to reflect the data for self-learning purposes and/or future review. A decision may include sharing the particular input with the particular audience, sharing a portion of the particular input (e.g., redacting certain portions) with the particular audience, or denying sharing of the particular input with the particular audience.

The method at 116 can also include sending a notification to an administrator or group of administrators if a sharing status was approved and converting the particular input to a non-editable format and watermarking the particular input. For instance, if the share tool 106 determines the particular input can be shared with the particular audience, the share tool 106, memory resource or storage, and AI can be updated, and administrators (e.g., those that would be on an associated panel) can be notified. The particular input is protected for security purposes with a non-editable format and watermark and is prepared for sharing. In some examples, an administrator may be able to block sharing of the particular input with the particular audience even if the share tool 106 has approved sharing.

At 118, a sender of the request to share the particular input can be notified of the sharing tool 106 results. For instance, he or she can be notified if sharing is approved, denied, or if the request was sent to an administrator for review. If the share tool 106 or the panel approves, the sender of the request may share the particular input with the particular audience.

The method, at 120, can include updating the share tool 106 and associated AI and memory resource or storage based on the data associated with the particular input as discussed herein. For instance, details of the request, departments and projects associated with the request, administrators associated with the request, results of the request, the particular audience, etc. can be saved in the memory resource or storage and the sharing tool 106 can self-learn to update and improve accuracy and efficiency of data sharing decisions.

At 122, feedback can be requested regarding the share tool 106. The sender of the request may be prompted to take a survey or leave feedback regarding ease of use, visuals, usefulness, and performance of the share tool 106. Based on the received feedback, the share tool 106 can be adjusted. For instance, based on the feedback, the share tool 106 may be adjusted to improve a user interface, accessibility, visuals, etc.

Figure 2:
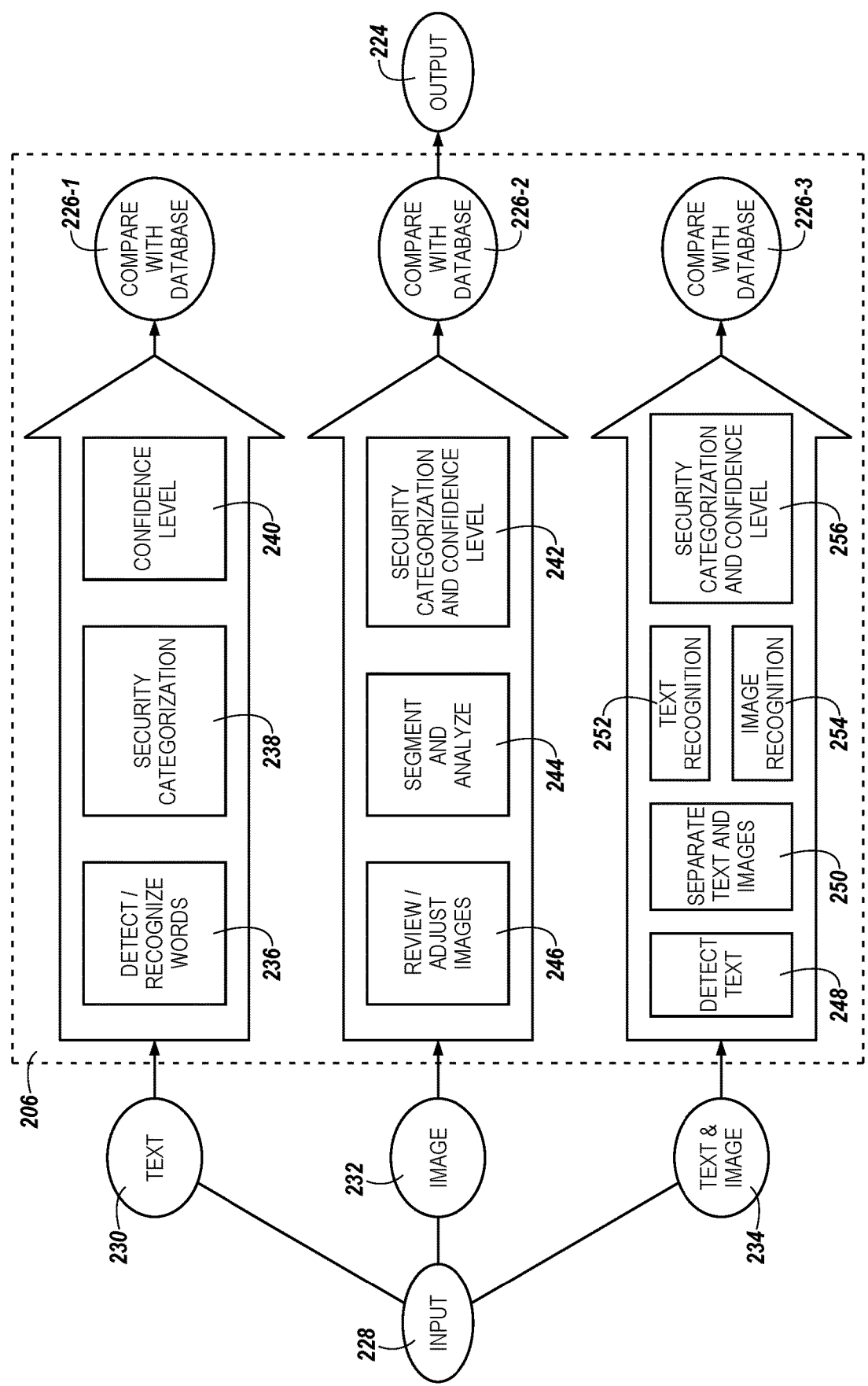
FIG. 2 is another flow diagram representing an example method for sharing data with a particular audience in accordance with a number of embodiments of the present disclosure.

FIG. 2 is another flow diagram representing an example method for sharing data with a particular audience in accordance with a number of embodiments of the present disclosure. At 228, first data (e.g., a particular input) is requested to be shared with a particular audience. For example, a processing resource can receive first data and can determine whether the first data comprises a combination of bits associated with text or an image, or both. That is, the first data is classified as one of text or text data at 230, image or image data at 232, or both (e.g., a combination of text and image data) at 234. The first data can be uploaded to a share tool 206, which may include or be communicatively coupled to the processing resource, that can utilize AI to determine whether the first data can be shared with the particular audience, cannot be shared with the particular audience, or if a share status is undetermined and further analysis by an administrator or administrators is warranted to make a sharing determination.

In some examples, the combination of bits can be compared to second data stored on a memory resource or storage coupled to the processing resource via a network (e.g., a database), and one or more words represented by the first data or one or more images represented by the first data, or both, based at least in part on the comparison. Each of the text, image, and both text and image examples are discussed separately with respect to FIG. 2.

For instance, if the first data is determined to be text, particular words in the text can be detected and/or recognized at 236, for instance using a text recognition tool. The words can be sorted, and a determination of their content can be made. For instance, the share tool 206 may have a pool of specific words that are not to be shared, a pool of words that may be shared, or a combination thereof. Using these pools and the particular words, metadata representative of a security categorization can be assigned to each of the words at 238 (e.g., based at least in part on the identified words). For instance, some words may be categorized as "highly confidential" (e.g., trade secret words, organization-specific words, etc.), while others may be categorized as "confidential", "internal use only", or "public" based on the pools. Different security levels may be possible and security levels are not limited to the four aforementioned levels.

At 240, metadata representative of a confidence level can be assigned to the different security categorizations (e.g., based at least in part on the identified words). As used herein, the confidence level includes a confidence in the categorization of the security level by the sharing tool 206. For instance, a 0 percent confidence level means no faith at all that if the analysis was repeated (or if it was performed by a human) that results would be the same. A 100 percent confidence level means there is no doubt at all that if the analysis was repeated (or if it was performed by a human) that results would be the same. Put another way, the higher the confidence level, the more faith in the security level categorization. For instance, a particular word that matches a "do not share" word in a pool may have a higher confidence level associated with its security categorization as compared to a particular word that matches neither a "do not share" or a "share" word in the pool. The first data or portions of the first data can be tagged based on their security categorization and/or their confidence level. For instance, a high confidence level may warrant a green flag tag, while a low confidence level may warrant a red flag tag. A highly confidential security categorization may warrant a purple flag, while a public security categorization may warrant an orange flag. Tagging is not limited to these categories or colors. In some examples, security level categorizations may be tagged separately from confidence levels. The tagging can be used by the share tool 206 or an administrator to increase efficiency in making sharing decisions.

At 226-1, the first data can be compared to the memory resource or storage (e.g., a database) to determine if input having the same components has been previously shared with the particular audience. A match is made, for instance, if particular words from the first data match words in the memory resource or storage that have been previously shared with the particular audience. In some examples, only some of the particular words may match the memory resource or storage, which can result in redactions of particular words that do not match. A match is not made, for instance, if particular words do not match those in the memory resource or storage that have been previously shared with the particular audience or if particular words do match words in the memory resource or storage, but those words were not previously shared with the particular audience. In some examples, the particular words may be matched with words in the memory resource or storage that were previously disallowed from sharing with the particular audience. Based on these comparisons, the share tool 206 can output data associated with the first data at 224, as will be discussed further herein.

If the first data is deemed an image, the image or images can be reviewed and/or adjusted at 246. For instance, the images can be placed in a same orientation, such that they are not tilted, rotated, etc. differently from one another. Each image can be segmented, and each segment can be analyzed at 244 to determine content. For instance, the share tool 206 may have a pool of images that are not to be shared, a pool of images that may be shared, or a combination thereof. Using these pools and the particular images, metadata representative of a security categorization can be assigned to each of the image segments at 242 (e.g., based at least in part on the identified image). For instance, some image segments may be categorized as "highly confidential" (e.g., trade secret words, organization-specific images, etc.), while others may be categorized as "confidential", "internal use only", or "public" based on the pools. Different security levels may be possible and security levels are not limited to the four aforementioned levels.

Also at 242, metadata representative of a confidence level can be assigned to the different security categorizations (e.g., based at least in part on the identified image). For instance, a particular image segment that matches a "do not share" image in a pool (e.g., a pool within the processing resource or storage) may have a higher confidence level associated with its security categorization as compared to a particular image segment that matches neither a "do not share" or a "share" word in the pool. The image segment security categorizations and confidence levels can be analyzed together for an overall image security categorization and associated confidence level, in some examples. Security level categorizations and/or confidence levels may be tagged for ease of review in some examples.

In a non-limiting example, the image is broken into segments and each segment is identified. For instance, an image may be broken into segments 1, 2, 3, and 4. Segments 1 and 2 may be matched with an image in the pool or recognized using image recognition tools as a shareable image (e.g., "public"). Segment 3 may be determined to be non-shareable image data (e.g., "highly confidential"), and segment 4 may be undetermined. Based on the security classifications and an associated confidence level, a sharing determination can be made.

At 226-2, the first data can be compared to the memory resource or storage (e.g., a database) to determine if input having the same components has been previously shared with the particular audience. A match is made, for instance, if particular image segments from the first data match image segments in the memory resource or storage that have been previously shared with the particular audience. In some examples, only some of the particular image segments may match the memory resource or storage, which can result in redactions of particular image segments that do not match. A match is not made, for instance, if particular image segments do not match those in the memory resource or storage that have been previously shared with the particular audience or if particular image segments do match image segments in the memory resource or storage, but those image segments were not previously shared with the particular audience. In some examples, the particular image segments may be matched with image segments in the memory resource or storage that were previously disallowed from sharing with the particular audience. Based on these comparisons, the share tool 206 can output data associated with the first data at 224, as will be discussed further herein.

If the first data is deemed a combination of text and an image or images, the share tool 206 can detect areas (e.g., rectangular areas) within the first data that may be text at 248 and separate the text from the image at 250. At 252, particular words in the text can be detected and/or recognized, as previously discussed herein, and at 254, the image or images can be reviewed and/or adjusted and segmented as previously discussed herein.

At 256, the particular words, image segments, and images can be assigned metadata representative of security categorizations and confidence levels as described previously herein (e.g., based at least in part on the identified text, image, or both). Security level categorizations and/or confidence levels may be tagged for ease of review in some examples. At 226-3, the first data can be compared to the memory resource or storage (e.g., a database) to determine if input having the same components has been previously shared with the particular audience. For example, as previously discussed herein, the text can be compared to text data in the memory resource or storage and the image or images can be compared to image data in the memory resource or storage. Based on these comparisons, the share tool 206 can output data associated with the first data at 224.

For instance, at 224, the sharing tool 206 can output results of the data sharing analysis. Results of the analysis can include the confidence levels, and actions can be taken based on the results and those associated confidence levels. Put another way, the output can include the first data or third data that comprises a modified combination of bits (e.g., redacted data, etc.) of the first data and can be transmitted to a set of users via the network and based at least in part on the security categorizations and the confidence levels. For instance, if a determination was made that the first data can be shared with the particular audience, the first data can be converted into a non-editable format and watermarked. However, if the confidence level is low, further analysis may be desired by an administrator.

If a determination is made that a sharing status of the first data was undetermined, an administrator or administrators can be sent a request for approval along with any determined confidence levels. The requestor can be notified of the results from the share tool 206 or the administrator and other associated data (e.g., security level categorizations, confidence levels, etc.) regardless of the determinations.

Figure 3:
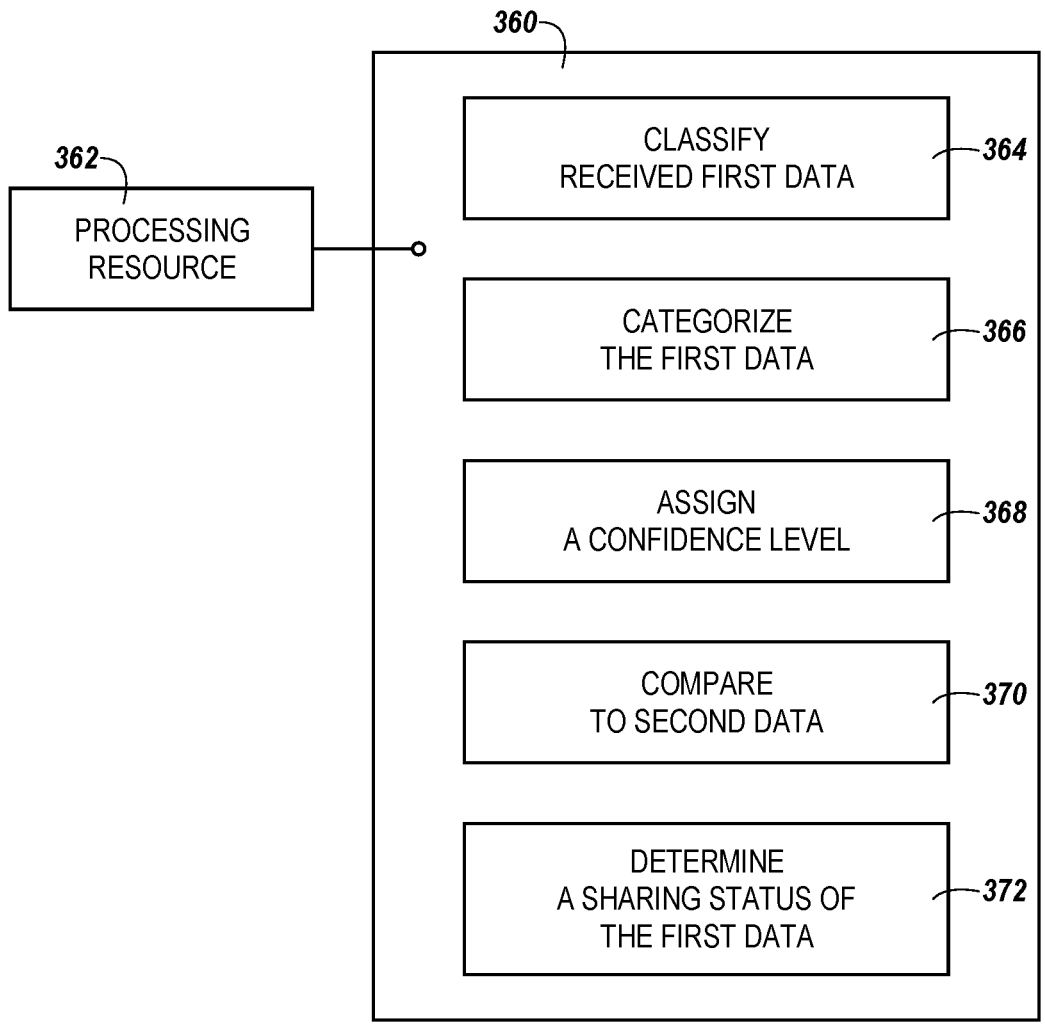
FIG. 3 is a functional diagram representing a processing resource in communication with a memory resource having instructions written thereon in accordance with a number of embodiments of the present disclosure.

FIG. 3 is a functional diagram representing a processing resource 362 in communication with a memory resource 360 having instructions 364, 366, 368, 370, 372 written thereon in accordance with a number of embodiments of the present disclosure. In some examples, the processing resource 362 and memory resource 360 comprise a share tool such as share tool 106 or 206 illustrated in FIGS. 1 and 2, respectively.

The system illustrated in FIG. 3 can be a server or a computing device (among others) and can include the processing resource 362. The system can further include the memory resource 360 (e.g., a non-transitory MRM), on which may be stored instructions, such as instructions 364, 366, 368, 370, 372. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 360 may be electronic, magnetic, optical, or other physical storage device that stores executable instructions. Thus, the memory resource 360 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 360 is a non-transitory MRM comprising Random Access Memory (RAM), an Electrically-Erasable Programmable ROM (EEPROM), a storage drive, an optical disc, and the like. The memory resource 360 may be disposed within a controller and/or computing device. In this example, the executable instructions 364, 366, 368, 370, 372 can be "installed" on the device. Additionally, and/or alternatively, the memory resource 360 can be a portable, external or remote storage medium, for example, that allows the system to download the instructions 364, 366, 368, 370, 372 from the portable/external/remote storage medium. In this situation, the executable instructions may be part of an "installation package". As described herein, the memory resource 360 can be encoded with executable instructions for performing a humidity-reducing action in an environment of an electrical component.

The instructions 364, when executed by a processing resource such as the processing resource 362, can include instructions to classify, using AI, received first data (e.g., a particular input received at the processing resource 362) having a combination of bits associated with text or an image, or both. For instance, it can be determined if the first data includes an image or images using an image recognition tool, for instance. If an image or images is detected, a follow-up check for text can be made, for instance using a word recognition tool and/or a tool that separates images and text. If no image is detected, it can be determined that the first data comprises text.

The instructions 366, when executed by a processing resource such as the processing resource 362, can include instructions to categorize, using the AI, the first data as one a plurality of predetermined security levels based on analyzed content of the classified first data. For instance, the text, image, or the combination thereof can be analyzed for particular words and/or image segments. Based on the content of these words and/or image segments, determinations can be made as to a security level categorization and associated metadata can be assigned to the first data. For instance, AI can be used to determine if received text includes trade secrets words that should be placed in a "highly confidential" security level categorization and/or if the text includes words that deserve "public" or other security level categorizations. Similar, AI can be used to determine security level categorizations for segments of a receive image or images.

The instructions 368, when executed by a processing resource such as the processing resource 362, can include instructions to assign, using the AI, a confidence level to the security level categorization. In such examples, metadata associated with the confidence level can be assigned to the first data. The confidence level can include a confidence in the categorization of the security level with a higher confidence level suggesting more faith in the security level categorization as compared to a lower confidence level. For instance, a particular word or image segment that matches a "do not share" word or image segment in a pool of words or image segments used for comparison may have a higher confidence level associated with its security categorization as compared to a particular word or image segment that matches neither a "do not share" or a "share" word or image segment in the pool.

The instructions 370, when executed by a processing resource such as the processing resource 362, can include instructions to compare the combination of bits to second data stored on the memory resource 360 or storage coupled to the processing resource via a network (e.g., a database). The memory resource 360 or storage can include data associated with previous requests to share input, including types of input, with whom the input was shared, who approved the sharing, when and how the input was shared, why the input was shared, data file types of the input, and input blocked from sharing, among others. The first data can be compared to the data in the memory resource 360 or storage to determine if data having the same components, the same sharing purpose, and the same proposed audience of the first data has been previously shared, previously blocked from sharing, or neither.

The instructions 372, when executed by a processing resource such as the processing resource 362, can include instructions to determine, based on the comparison, the security level categorization and the confidence level, a sharing status of the first data, the sharing status including a determination whether the first data can be shared with a particular audience, cannot be shared with the particular audience, or it is undetermined if the first data can be shared with the particular audience.

For example, if a match is made between the first data and the memory resource 360 or storage suggesting the first data can be shared and a confidence level in the security level categorization is high, a sharing status may be "shareable" indicating that the first data can be shared with the particular audience. If a match is made between first data and the memory resource 360 or storage suggesting the first data cannot be shared and a confidence level in the security level categorization is high, a sharing status may be "not shareable" indicating that first data cannot be shared with the particular audience. If a confidence level is low in either situation, the first data may be sent to an administrator or administrators for further review with a sharing status of "undetermined". Similar, if no match is made between the first data and the memory resource 360 or storage, the sharing status may be "undetermined", and the first data may be sent to an administrator or administrators for further review.

In some examples, the instructions can be executable to notify a sender of the request that the first data can be shared with the particular audience responsive to the sharing status indicating that the first data can be shared. For instance, if the first data matches data that has previously been shared with the particular audience, the sender can be notified that they can commence sharing. In some examples, the sender may be given instructions as to what portions of the first input can be shared with the particular audience. For instance, the sender may be instructed to redact highly confidential portions.

The instructions can be executable to notify the sender of the request that the first data cannot be shared with the particular audience responsive to the sharing status indicating that the first data cannot be shared. For instance, if the first data matches data that previously has been denied sharing with the particular audience, the sender can be notified that they cannot commence sharing.

In some examples, the instructions can be executable to request an approval from an administrator to share the first data with the particular audience responsive to an undetermined sharing status and notify the sender of a result of the requested approval. For instance, if there is no match (either approval or denial) with the first data, an administrator or administrators may be prompted to review the request. If the administrator or administrators indicate the first data can be shared with the particular audience, the sender can be notified that they can commence sharing. In some instances, the sender may be given instructions as to what portions of the first data can be shared with the particular audience. For example, the sender may be instructed to redact highly confidential portions. If the administrator or administrators indicate the first data cannot be shared with the particular audience, the sender can be notified that they cannot share the first data with the particular audience.

In some examples, responsive to the classification being text, the instructions 364 can be executable to detect a specific word or groups of words in the text, categorize, using the AI, the specific word or groups of words into a respective one of the plurality of security levels, and assign, using the AI, each of the assigned security levels a confidence level (e.g., and the first data associated metadata). The specific word or groups of words can be compared to words in the memory resource 360 or storage to determine a sharing status of the first data.

In some examples, responsive to the classification being an image, the instructions 364 can be executable to adjust an orientation of the image, segment the image into a plurality of segments, categorize, using the AI, each segment of the plurality of segments into a respective one of the plurality of security levels, and assign, using the AI, each of the assigned security levels a confidence level (e.g., and the first data associated metadata). The image segments can be compared to images in the memory resource 360 or storage to determine a sharing status of the first data.

In some examples, responsive to the classification being a combination of text and an image or images, the instructions 364 can be executable to separate the first data into text and the image s, detect a specific word or groups of words in the text, adjust an orientation of the image, and segment the image into a plurality of segments. The specific word or groups of words can be categorized, using the AI, and each segment of the plurality of segments into a respective one of the plurality of security levels, and assign, using the AI, each of the assigned security levels a confidence level (e.g., an associated metadata to the first data). The specific words or groups of words and the image segments can be compared to words and images in the memory resource 360 or storage to determine a sharing status of the first data.

Figure 4:
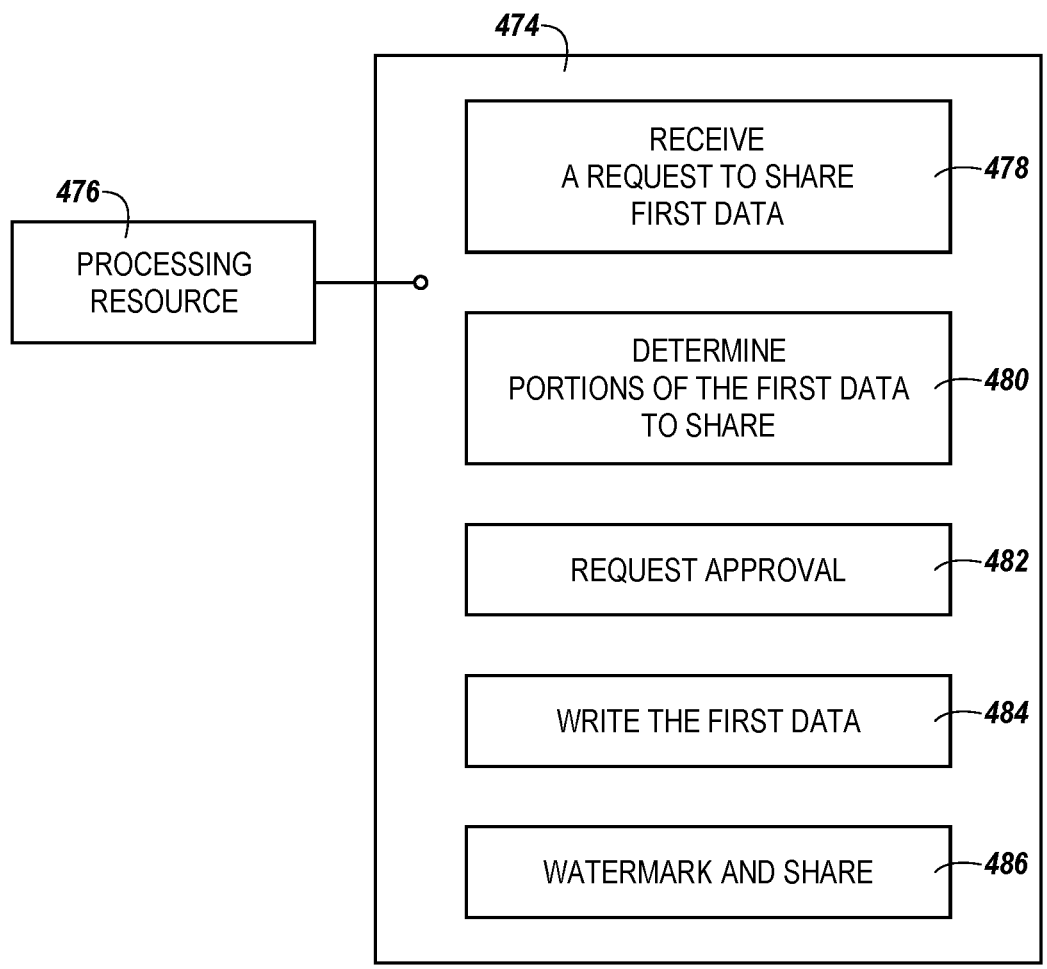
FIG. 4 is another functional diagram representing a processing resource in communication with a memory resource having instructions written thereon in accordance with a number of embodiments of the present disclosure.

FIG. 4 is another functional diagram representing a processing resource 476 in communication with a memory resource 474 having instructions 478, 480, 482, 484, 486 written thereon in accordance with a number of embodiments of the present disclosure. In some examples, the processing resource 476 and the memory resource 474 may be analogous to processing resource 362 and memory resource 360, respectively, as described with respect to FIG. 3. In some examples, the processing resource 476 and the memory resource 474 comprise a share tool such as share tool 106 or 206 illustrated in FIGS. 1 and 2, respectively.

The instructions 478, when executed by a processing resource such as the processing resource 474, can include instructions to receive a request to share first data received at the processing resource 474 with a particular audience. For instance, a request can be uploaded to a share tool for a data sharing decision. In some examples, a determination can be made whether the first data comprises a combination of bits associated with text or an image, or both (e.g., a combination of text and image). For example, text recognition, image recognition, and other tools can be used to determine the data type (e.g., image, text, or both). In some instances, AI can be used to recognize industry-standard file types associated with the first data such as documents (e.g., pdf, word processing programs, etc.), images, paragraphs from particular file formats, and/or circuit board files (e.g., circuitry, connections in memory types (e.g., NAND)), among others.

In some instances, a security level category (e.g., "highly confidential", "confidential", "internal only", "public", etc.) can be assigned to the first portion, the second portion, and the third portion, and a confidence level can be to the security level categorization using the AI (e.g., along with associated metadata assigned to the first data). For instance, if the first data, based on trained data, matches data in a pool that was previously categorized as "public" with a lower confidence level, the confidence level in the security level categorization of the first data may be lower as compared to first data that matches data in a pool that was previously categorized as "public" with a higher confidence level. The first portion, the second portion, and the third portion can be tagged with identifying markers based on their associated security level category, associated confidence level, or both.

The instructions 480, when executed by a processing resource such as the processing resource 474, can include instructions to determine, using AI, a first portion of the first data that can be shared with the particular audience, a second portion of the first data that cannot be shared with the particular audience, a third portion of the first data with an undetermined sharing status, or a combination thereof based on comparison of the request to second data stored on the memory resource 474 or storage coupled to the processing resource 476 via a network (e.g., a database) communicatively coupled to the medium. For instance, all of the first data may be shareable with the particular audience (e.g., if all of the first data matches exactly with a previous request in the memory resource 474 or storage that was shareable with the particular audience) or none of the first data may be shareable with the particular audience (e.g., if all of the first data matches exactly with a previous request in the memory resource 474 or storage that was deemed not shareable with the particular audience). In some examples, a portion of the first data may be shareable with the particular audience, as long as other portions are redacted, for instance, if some of the first data matches exactly with a previous request in the memory resource 474 or storage that was shareable with the particular audience, but certain portions do not, such as a "highly confidential" portion that can be redacted.

The instructions 482, when executed by a processing resource such as the processing resource 474, can include instructions to request approval from an administrator to share the third portion with the particular audience. If a determination cannot be made using the memory resource 474 or storage, for instance if no shareable match or non-shareable match can be made, an administrator or administrators (e.g., a panel of administrators) may be prompted to decide based on their knowledge of the subject matter, the first data, the particular audience, and historical approaches. The administrator or administrators may decide the first data can be shared with the particular audience, cannot be shared with the particular audience, or a portion of the first data can be shared with the particular audience (e.g., portions must be redacted before sharing).

The instructions 484, when executed by a processing resource such as the processing resource 474, can include instructions to write data (e.g., the first data) associated with the request, the first portion, the second portion, and the third portion in the memory resource 474 or storage. For example, the data associated with the request, the first portion, the second portion, and the third portion in the memory resource 474 or storage can include whether the data has been shared, whether the data is currently being shared, whether the data is planned to be shared, with whom the data was or is planned to be shared, who requested sharing of the data, the administrator, and keywords associated with the data, or a combination thereof.

In some examples, the memory resource 474 or storage can be updated using the written data associated with the request, the first portion, the second portion, and the third portion in the memory resource 474 or storage. The updated memory resource 474 or storage, along with updates to AI can allow for self-learning and improved accuracy, efficiency, and consistency in data sharing decisions.

The instructions 486, when executed by a processing resource such as the processing resource 474, can include instructions to watermark and share with the particular audience the first portion and the third portion responsive to the third portion being approved for sharing, and watermark and share with the particular audience the first portion responsive to the third portion being approved for sharing.

In some examples, performance input regarding the medium can be received from a party sending the request, the particular audience, or a combination thereof, and the performance input can be implemented into the medium. For instance, the party may receive a request (e.g., a survey) to rate their experience with a share tool up completion of a sharing request process.

FIG. 5 is yet another flow diagram representing an example method 590 for sharing data with a particular audience in accordance with a number of embodiments of the present disclosure. The method 590 can be performed by a system such as the systems described with respect to FIGS. 3 and 4. Similar to FIG. 1, data desired to be shared (e.g., first data) is referred to with respect to FIG. 5 as "particular input" so as to differentiate from other data referred to with respect to the description of FIG. 5.

At 591, the method 590 includes receiving a request at a processing resource to share a particular input with a particular audience. For instance, a request can be received at a share tool as an upload and can include different file types ((e.g., pdf, word processing programs, etc.), images, paragraphs from particular file formats, and/or circuit board files (e.g., circuitry, connections in memory types (e.g., NAND)), among others) and information (e.g., why the request is being made, support documents, etc.) In some examples, the share tool and associated AI can recognize industry-standard file types.

The particular input, in some examples, can be classified as text or an image, or both. Based on the classification, the particular input can be analyzed using word recognition tools, image recognition tools, image/word separation tools, etc., to determine content of the particular input.

At 592, the method 590 includes comparing the particular input to a memory resource or storage (e.g., database) communicatively coupled to the processing resource to determine whether the particular input has been previously shared with the particular audience. The method 590, at 593, includes, determining a sharing status of the particular input, the sharing status including a determination whether the particular input can be shared with the particular audience, cannot be shared with the particular audience, or it is undetermined if the particular input can be shared with the particular audience based on the comparison.

For instance, using AI associated with the share tool, a "shareable" sharing status may be determined if the comparison results in a match of the particular input and data previously deemed shareable with the particular audience. A "not shareable" sharing status may result if the comparison shows a match of the particular input and data previously deemed not shareable with the particular audience. An "undetermined" sharing status may result if neither of the aforementioned matches occurs, if a partial match occurs (e.g., same data with a different particular audience, some overlapping data, etc.), or if no match occurs.

At 594, the method 590 includes notifying a sender of the request that the particular input can be shared with the particular audience responsive to the sharing status indicating that the particular input can be shared. In such an example, the particular input can be watermarked, and the watermarked particular input can be shared with the particular audience. At 595, the method 590 includes notifying the sender of the request that the particular input cannot be shared with the particular audience responsive to the sharing status indicating that the particular input cannot be shared.

At 596, the method 590 includes requesting an approval from an administrator to share the particular input with the particular audience responsive to an undetermined sharing status and notifying the sender of results of the requested approval. For instance, an administrator or administrators (e.g., a panel of administrators) may be prompted to decide a sharing status based on their knowledge of the subject matter, the particular input, the particular audience, and historical approaches. The administrator or administrators may decide the particular input can be shared with the particular audience, cannot be shared with the particular audience, or a portion of the particular input can be shared with the particular audience (e.g., portions must be redacted before sharing).

In some examples, the particular input can be categorized as one of a plurality of predetermined security levels (e.g., "highly confidential", "confidential", "internal only", "public", etc.) based on the content of the particular input, and/or a confidence level can be assigned (e.g., using AI) to the security level categorization. For instance, if the particular input, based on trained data, matches data in a pool that was previously categorized as "public" with a lower confidence level, the confidence level in the security level categorization of the particular input may be lower as compared to particular input that matches data in a pool that was previously categorized as "public" with a higher confidence level. The first portion, the second portion, and the third portion can be tagged with identifying markers based on their associated security level category, associated confidence level, or both.

In some examples, the memory resource or storage can be updated with the sharing status of the particular input responsive to the sharing status indicating the particular input can be shared or cannot be shared or with an approval/denial decision from the administrator responsive to an undetermined sharing status. Information including who sent the request, administrators that reviewed requests, and why decisions were made can be included in the updates, as well. These updates can be used in future data sharing requests, as the share tool can self-learn using this information.

Figure 6:
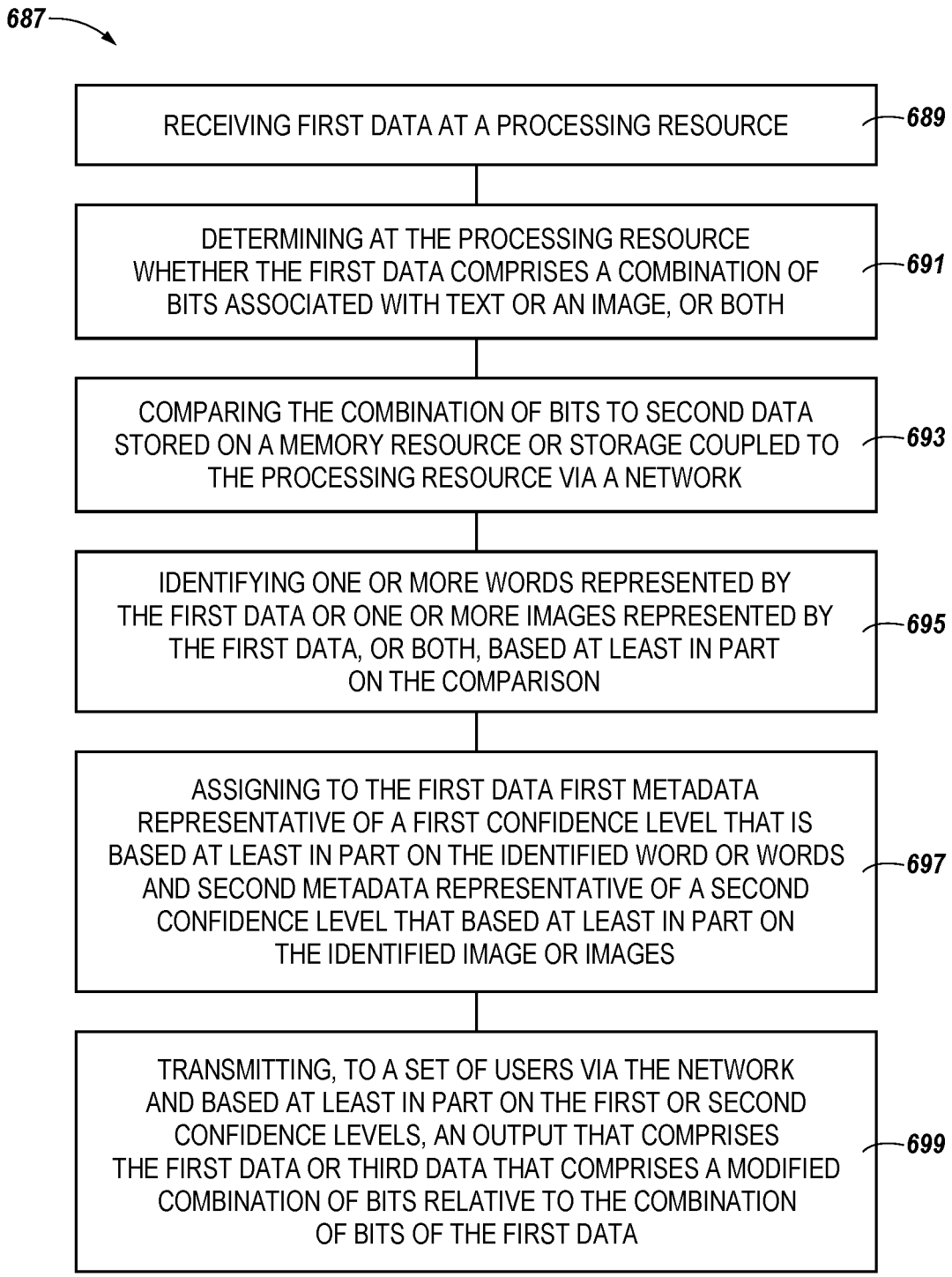
FIG. 6 is another flow diagram representing an example method for sharing data with a particular audience in accordance with a number of embodiments of the present disclosure.

FIG. 6 is another flow diagram representing an example method 687 for sharing data with a particular audience in accordance with a number of embodiments of the present disclosure. The method 687 can be performed by a system such as the systems described with respect to FIGS. 3 and 4.

At 689, the method 687 can include receiving first data at a processing resource. The first data can include a particular input desired to be shared with a particular audience. For instance, an engineer at a first company may desire to share a particular mechanical plan with an engineer at a second company.

At 691, the method 687 can include determining at the processing resource whether the first data comprises a combination of bits associated with text or an image, or both, and at 693, the method 687 can include comparing the combination of bits to second data stored on a memory resource or storage coupled to the processing resource via a network. At 695, the method 687 can include identifying one or more words represented by the first data or one or more images represented by the first data, or both, based at least in part on the comparison. For instance, the first data can be analyzed by comparisons to the second data using word recognition tools, image recognition tools, image/word separation tools, etc., to determine content of the first data.

For instance, if the first data is determined to be text, particular words in the text can be detected and/or recognized, for instance using a text recognition tool. The words can be sorted, and a determination of their content can be made. If the first data is deemed an image, the image or images can be reviewed and/or adjusted. For instance, the images can be placed in a same orientation, such that they are not tilted, rotated, etc. differently from one another. Each image can be segmented, and each segment can be analyzed to determine content. If the first data is deemed a combination of text and an image or images, areas can be detected (e.g., rectangular areas) within the first data that may be text and separate the text from the image. Particular words in the text can be detected and/or recognized, and the image or images can be reviewed and/or adjusted and segmented.

At 697, the method 687 can include assigning to the first data first metadata representative of a first security categorization and a first confidence level that is based at least in part on the identified word or words and second metadata representative of a second security categorization and a second confidence level that based at least in part on the identified image or images. For example, the particular words, image segments, and images can be assigned metadata representative of security categorizations and confidence levels as described previously herein. In some examples, third metadata can be assigned to the first data representative of one of a plurality of predetermined security levels that is based at least in part on the identified word or words, the identified image or images, or both. Such predetermined security levels, for instance, may include "highly confidential", "confidential", "internal only", "public", etc. In some instances, fourth metadata may be assigned to one of the plurality of predetermined security levels that is based at least in part on the identified word or words, the identified image or images, or both. Security level categorizations and/or confidence levels may be tagged for ease of review in some examples.

In some examples, the method 687 can include determining a sharing status (e.g., "sharable" share status, "not sharable" share status, "undetermined" share status, etc.) of the first data based at least in part on the comparison of the combination of bits to the second data, the first confidence level, and the second confidence level. The first data can be compared to the memory resource or storage (e.g., a database) to determine if input having the same components has been previously shared with the particular audience. A match is made, for instance, if particular words from the first data match words in the memory resource or storage that have been previously shared with the particular audience. In some examples, only some of the particular words may match the memory resource or storage, which can result in redactions of particular words that do not match. A match is not made, for instance, if particular words do not match those in the memory resource or storage that have been previously shared with the particular audience or if particular words do match words in the memory resource or storage, but those words were not previously shared with the particular audience. In some examples, the particular words may be matched with words in the memory resource or storage that were previously disallowed from sharing with the particular audience. Based on these comparisons, the sharing status can be determined.

In some examples, the method 687 can include updating the memory resource or storage with the sharing status of the first data responsive to the sharing status indicating the first can be shared or cannot be shared and updating the memory resource or storage coupled to the processing resource via the network with an approval decision from an administrator responsive to an undetermined sharing status. This can re-train data used to make sharing determinations. For instance, AI can be used to make sharing status determinations, and an updated memory resource or storage can increase accuracy and efficiency.

In some examples, the method 687 can include notifying a sender of the first data that the first can be shared with a particular audience responsive to the sharing status indicating that the first data can be shared, notifying the sender of the first data that the first data cannot be shared with the particular audience responsive to the sharing status indicating that the first data cannot be shared, and requesting an approval from an administrator to share the first data with the particular audience responsive to an undetermined sharing status and notifying the sender of results of the requested approval. If the sharing status indicates the first data can be shared, the first data can be watermarked and shared with the particular audience.

At 699, the method 687 can include transmitting, to a set of users via the network and based at least in part on the first or second security categorizations and the first or second confidence levels, an output that comprises the first data or third data that comprises a modified combination of bits relative to the combination of bits of the first data. The third data, for instance, can include the first data with redacted material or other modification, or can include the first data with instructions to an administrator to review the first data and other data associated therewith (security classifications, confidence levels, etc.). In such examples, the set of users can include the particular audience, the sender of the first data, and/or an administrator or team of administrators set to review the first data.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:
1. A method, comprising:
   receiving first data at a processing resource;
   determining at the processing resource whether the first data comprises a combination of bits associated with text or an image, or both;
   comparing the combination of bits to second data stored on a memory resource or storage coupled to the processing resource via a network;
   identifying one or more words represented by the first data or one or more images represented by the first data, or both, based at least in part on the comparison;
   assigning to the first data first metadata representative of a first security categorization and a first confidence level that is based at least in part on the identified word or words and second metadata representative of a second security categorization and a second confidence level that is based at least in part on the identified image or images;
   transmitting, to a set of users via the network and based at least in part on the first or second security categorizations and the first or second confidence levels, an output that comprises the first data or third data that comprises a modified combination of bits relative to the combination of bits of the first data;
   determining a sharing status of the first data based at least in part on the comparison of the combination of bits to the second data, the first confidence level, and the second confidence level;
   updating the memory resource or storage coupled to the processing resource via the network with the sharing status of the first data responsive to the sharing status indicating the first data can be shared or cannot be shared; and updating the memory resource or storage coupled to the processing resource via the network with an approval decision from an administrator responsive to an undetermined sharing status.

2. The method of claim 1, further comprising assigning to the first data third metadata representative of one of a plurality of predetermined security levels that is based at least in part on the identified word or words, the identified image or images, or both.

3. The method of claim 2, further comprising assigning fourth metadata to the one of the plurality of predetermined security levels that is based at least in part on the identified word or words, the identified image or images, or both.

4. The method of claim 1, further comprising: notifying a sender of the first data that the first data can be shared with a particular audience responsive to the sharing status indicating that the first data can be shared;

notifying the sender of the first data that the first data cannot be shared with the particular audience responsive to the sharing status indicating that the first data cannot be shared; and requesting an approval from an administrator to share the first data with the particular audience responsive to an undetermined sharing status and notifying the sender of results of the requested approval.

5. The method of claim 1, wherein responsive to the sharing status indicating the first data can be shared:

watermarking the first data; and sharing the watermarked first data with a particular audience.

6. A method, comprising:

receiving first data at a processing resource;

determining at the processing resource whether the first data comprises a combination of bits associated with text or an image, or both;

comparing the combination of bits to second data stored on a memory resource or storage coupled to the processing resource via a network;

identifying one or more words represented by the first data or one or more images represented by the first data, or both, based at least in part on the comparison;

assigning to the first data first metadata representative of a first security categorization and a first confidence level that is based at least in part on the identified word or words and second metadata representative of a second security categorization and a second confidence level that is based at least in part on the identified image or images;

transmitting, to a set of users via the network and based at least in part on the first or second security categorizations and the first or second confidence levels, an output that comprises the first data or third data that comprises a modified combination of bits relative to the combination of bits of the first data;

determining a sharing status of the first data based at least in part on the comparison of the combination of bits to the second data, the first confidence level, and the second confidence level;

notifying a sender of the first data that the first can be shared with a particular audience responsive to the sharing status indicating that the first data can be shared;

notifying a sender of the first data that the first data can be shared with a particular audience responsive to the sharing status indicating that the first data can be shared; and requesting an approval from an administrator to share the first data with the particular audience responsive to an undetermined sharing status and notifying the sender of results of the requested approval.

7. The method of claim 6, further comprising assigning to the first data third metadata representative of one of a plurality of predetermined security levels that is based at least in part on the identified word or words, the identified image or images, or both.

8. The method of claim 7, further comprising assigning fourth metadata to the one of the plurality of predetermined security levels that is based at least in part on the identified word or words, the identified image or images, or both.

9. The method of claim 6, further comprising: updating the memory resource or storage coupled to the processing resource via the network with the sharing status of the first data responsive to the sharing status indicating the first data can be shared or cannot be shared; and updating the memory resource or storage coupled to the processing resource via the network with an approval decision from an administrator responsive to an undetermined sharing status.

10. The method of claim 6, wherein responsive to the sharing status indicating the first data can be shared:

watermarking the first data; and sharing the watermarked first data with the particular audience.

11. A non-transitory machine-readable medium comprising a processing resource in communication with a memory resource having instructions executable to:

receive first data;

determine whether the first data comprises a combination of bits associated with text or an image, or both;

compare the combination of bits to second data stored on the memory resource or storage coupled to the processing resource via a network;

identify one or more words represented by the first data or one or more images represented by the first data, or both, based at least in part on the comparison;

assign to the first data first metadata representative of a first security categorization and a first confidence level that is based at least in part on the identified word or words and second metadata representative of a second security categorization and a second confidence level that is based at least in part on the identified image or images;

transmit, to a set of users via the network and based at least in part on the first or second security categorizations and the first or second confidence levels, an output that comprises the first data or third data that comprises a modified combination of bits relative to the combination of bits of the first data;

determine a sharing status of the first data based at least in part on the comparison of the combination of bits to the second data, the first confidence level, and the second confidence level;

update the memory resource or storage coupled to the processing resource via the network with the sharing status of the first data responsive to the sharing status indicating the first data can be shared or cannot be shared; and update the memory resource or storage coupled to the processing resource via the network with an approval decision from an administrator responsive to an undetermined sharing status.

12. The non-transitory machine-readable medium of claim 11, further comprising the instructions executable to:
notify a sender of the first data that the first data can be shared with a particular audience responsive to the sharing status indicating that the first data can be shared;
notify the sender of the first data that the first data cannot be shared with the particular audience responsive to the sharing status indicating that the first data cannot be shared; and
request an approval from an administrator to share the first data with the particular audience responsive to an undetermined sharing status and notify the sender of results of the requested approval.

\* \* \* \* \*